United States Patent [19]

Tagami et al.

[11] Patent Number: 4,494,116
[45] Date of Patent: Jan. 15, 1985

[54] APPARATUS FOR VISUALLY INDICATING A CURRENT TRAVEL ROUTE OF A VEHICLE

[75] Inventors: Katsutoshi Tagami; Tsuneo Takahashi, both of Saitama; Shinichiro Yasui, Tokyo; Masao Sugimura, Saitama; Fumitaka Takahashi, Tokyo, all of Japan

[73] Assignee: Honda Giken Kogyo Kabushiki Kaisha, Tokyo, Japan

[21] Appl. No.: 298,633

[22] Filed: Sep. 2, 1981

[30] Foreign Application Priority Data

Sep. 4, 1980 [JP] Japan .............................. 55-122892
Sep. 4, 1980 [JP] Japan .............................. 55-122893
Sep. 4, 1980 [JP] Japan .............................. 55-122895

[51] Int. Cl.$^3$ ........................ G08G 1/12; G01P 15/00
[52] U.S. Cl. .............................. 340/995; 73/516 LM; 73/505; 340/988; 364/449; 364/460
[58] Field of Search ................. 340/23, 24, 632, 995, 340/988; 364/449, 460; 73/516 LM, 505

[56] References Cited

U.S. PATENT DOCUMENTS

| | | | |
|---|---|---|---|
| 3,631,729 | 1/1972 | Moore | 73/516 LM |
| 3,899,769 | 8/1975 | Honore et al. | 340/24 |
| 4,139,889 | 2/1979 | Ingels | 340/24 |
| 4,348,900 | 9/1982 | Takahashi et al. | 73/516 LM |

*Primary Examiner*—James J. Groody

*Attorney, Agent, or Firm*—Irving M. Weiner; Pamela S. Burt; Anthony L. Cupoli

[57] ABSTRACT

A visual travel route indicating apparatus, for use in an automotive vehicle or the like, including a distance sensor for detecting a current distance of travel of the vehicle, a gas rate sensor for detecting a current azimuthal deviation generated by the vehicle during a turning motion, a thermostatic control chamber for enclosing the gas rate sensor hermetically from external temperature fluctuations, and a signal processing unit for arithmetically obtaining a current location plotted on two-dimensional coordinates per a given unit travel distance of the vehicle from the outputs of the two sensors and storing the thus-obtained location data in sequence so as to be read out subsequently for a continuous visual indication of a current locus of the vehicle on a display. The power supply to the thermostatic control chamber is optimally controlled in conjunction with the on/off state of the ignition switch of the vehicle. The visual indication of a current travel route of the vehicle is inhibited until the atmospheric temperature of the thermostatic chamber reaches a desired constant level, whereupon the offset adjustment of the gas rate sensor output is automatically normalized so as to present a precise visual indication of the vehicle's travel route on the display. Further, the occurrence of an abnormal temperature within the atmosphere of the thermostatic control chamber is detected so as to provide a warning to a driver of the vehicle.

5 Claims, 5 Drawing Figures

APPARATUS FOR VISUALLY INDICATING A CURRENT TRAVEL ROUTE OF A VEHICLE

BACKGROUND OF THE INVENTION

1. Field of the Invention

The present invention relates generally to a visual travel route indicating apparatus for a vehicle. More particularly, the invention relates to a visual travel route indicating apparatus for use in an automotive vehicle or the like which is specifically designed to visually display combined information relating to a current status of travel of the vehicle, such as location, path of travel, travel direction, etc.

2. Description of Relevant Art

In attempts to prevent the driver of an automotive vehicle or the like from losing his way while driving such as at night or in unfamiliar surroundings away from his desired route of travel, there have been developed a variety of devices specifically designed to indicate continuously or discretely a current position of the vehicle, or like information, by way of an indication panel or display screen including a related road map or the like disposed at the driver's seat to provide ready guidance relating to the vehicle's current status of travel with respect to a desired course of travel.

Conventional travel route indicating devices for application as described above are constructed to operate in such a manner that a current travel distance of a vehicle is detected in accordance with its travel speed and time by a distance detecting unit. A current bearing or extent of azimuthal deviation of the vehicle is detected by a rate type bearing detecting unit adapted to detect a possible angular velocity as may be produced about the axis of yawing of the vehicle during a turning operation, and a current location of the vehicle along its travel route is obtained from an arithmetic operation performed on the thus-detected data as to the location of the vehicle. The thus-obtained results are indicated by way of spot information varying from time to time on a display unit which visually indicates a suitable road map of routes or roads on which the vehicle is to travel.

With the conventional arrangement as described above, it may be contemplated that a gas rate sensor be incorporated as means for detecting a current bearing of the vehicle by virtue of advantages afforded thereby. Such advantages include a substantial resistance against physical vibrations, a substantial sensitivity and a rapid response in comparison with a mechanical detecting device such as a gyroscope or the like. However, because such particular gas rate sensor is designed for detecting a possible angular velocity of the vehicle during a turning operation (if any) by detecting a fractional amount of change in a heat to be sensed by a gas flow sensor, which occurs in accordance with a current change in gas flow within the sensor from such an azimuthal change in motion of the vehicle, a current fluctuation in ambient temperature would unavoidably cause an immediate substantial disturbance to the sensor. Therefore, it is normally disadvantageous and impractical to incorporate a gas rate sensor of the aforesaid type, which is substantially susceptible to temperature fluctuations when employed in an automotive vehicle or the like where there would normally be a relatively high tendency toward such temperature fluctuations.

The present invention overcomes the aforesaid inconveniences and disadvantages attendant conventional travel route indicating apparatus specifically designed to detect and display the azimuthal change or angular velocity as produced about the axis of yawing of the automotive vehicle or the like by way of a gas rate sensor, which apparatus have not provided satisfactory results in operation.

SUMMARY OF THE INVENTION

The present invention provides a visual travel route indicating apparatus for use in a vehicle wherein a currennt location point in terms of two-dimensional coordinates per a given unit distance of travel of the vehicle is arithmetically obtained from a current output from a distance sensor for detecting a current distance of travel of the vehicle with respect to a starting point and a current output from a gas rate sensor for detecting a current azimuthal deviation generated by the vehicle during a turning operation, the thus-obtained data on a current location of the vehicle changing from time to time as the vehicle travel progresses being stored in sequence so as to be appropriately processed for visually displaying a finite yet continuous path of travel of the vehicle. The invention comprises a thermostatic control chamber and the gas rate sensor is isolated in the atmosphere of the thermostatic control chamber to permit heating thereof to a desired constant temperature. The invention further comprises a power source, power supply circuit means for detecting the on/off state of an ignition switch of the vehicle, and relay means included within the power supply circuit means and operatively connected with the power source for directly supplying power from the source to the thermostatic control chamber when the ignition switch is detected to be closed. Also provided is self-holding circuit means operatively connected with the relay means for holding the relay means so as to supply power to the thermostatic control chamber when the ignition switch is detected to be opened.

A primary object of the present invention is to provide an improved visual travel route indicating apparatus, for use in an automotive vehicle or the like, which incorporates a gas rate sensor therein in such a manner that there is provided a specifically designed constant-temperature or thermostatic control chamber, equipped with a suitable heating means, in which the gas rate sensor is hermetically enclosed so as to be isolated from a possible effect of temperature changes therearound. Further, the heating means is interlocked with an ignition switch function of the vehicle so as to be controlled for optimal temperature control.

Another object of the invention is to provide an improved travel route indicating apparatus which is adapted to initially be placed in a waiting state in operation to display a travel path of the vehicle until the temperature of the atmosphere in a thermostatic control chamber reaches a stable or equilibrium condition at the time when the apparatus is started, and then prepare to perform a visual indication of a current precise status of travel of the vehicle upon the establishment of the desired constant or equilibrium condition with an automatic due offset adjustment of the current output of the gas rate sensor under such stable temperature condition so established.

It is a further object of the invention to provide an improved visual travel route indicating apparatus which incorporates a gas rate sensor within a thermostatic control chamber equipped with a suitable heating means so that the gas rate sensor may be effectively isolated from the undesirable effect of temperature changes outside the thermostatic control chamber, and which is also adapted to detect the occurrence of an abnormal temperature within the thermostatic control chamber, if any.

The above and further objects, details and advantages of the present invention will become more apparent from the following detailed description of a preferred embodiment of the invention, when read in conjunction with the accompanying drawings, wherein like parts are designated by like reference numerals.

DETAILED DESCRIPTION OF PREFERRED EMBODIMENTS

Figure 1:
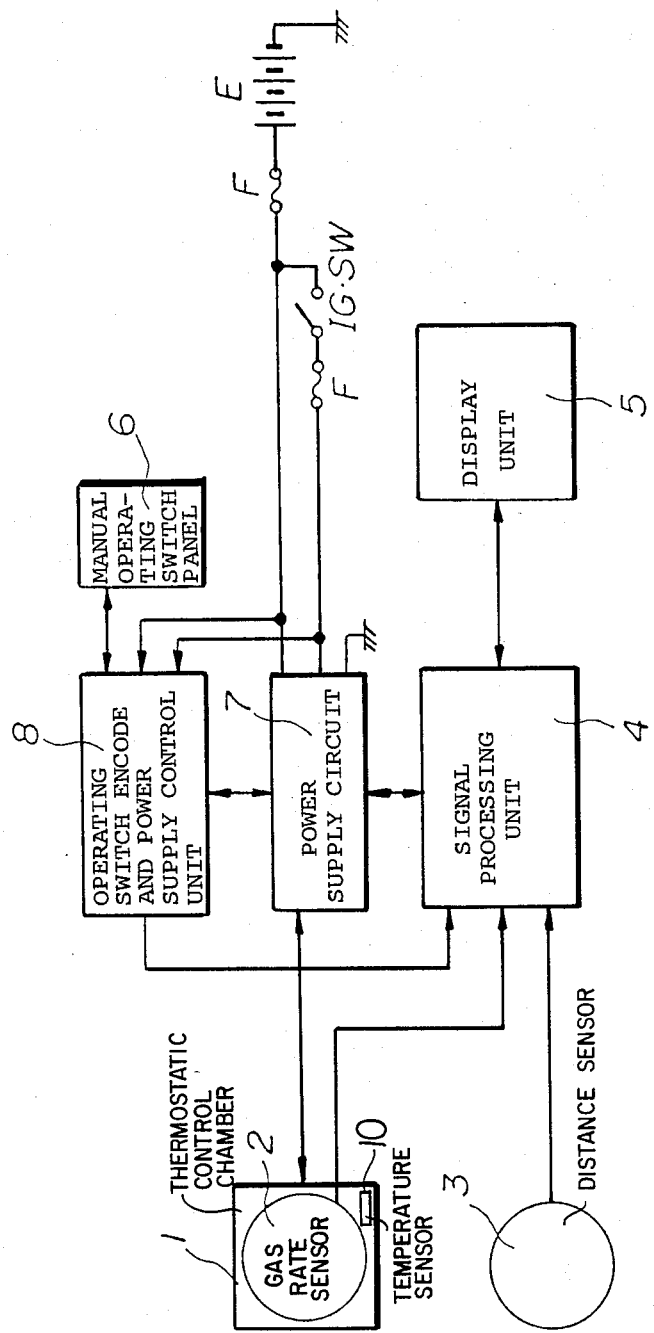
FIG. 1 is a schematic block diagram showing the general construction of a preferred embodiment of the visual travel route indicating apparatus in accordance with the present invention.

With reference to FIG. 1, there is schematically shown a visual travel route indicating apparatus according to the present invention. A constant-temperature or thermostatic control chamber 1 is heated to a controlled constant temperature level with a suitable heater, and a gas rate sensor 2 is provided which is adapted to output electrical signals proportional to an amount of change in a current bearing or azimuthal deviation generated by a vehicle during a turning motion thereof along a travel route or road. A distance sensor 3 is adapted to output electrical signals proportional to a current distance of travel of the vehicle, and a signal processing unit 4 operates arithmetically to obtain a current location or point plotted on two-dimensional corrdinates per a given unit distance of travel of the vehicle in accordance with each of the outputs from sensors 2 and 3, and stores the thus-obtained data on a current location on the two-dimensional coordinates while changing from time to time so as to be held as current finite yet continuous information on a current location of the vehicle which corresponds to a current path or route of travel of the vehicle, so as to thus centrally control the entire apparatus. A display unit 5 is adapted to visually display such information updated from time to time in accordance with the outputs processed by the signal processing unit 4 on a path of travel, a current direction of travel, a current travel distance, and a time required for a given amount of distance up to a current location of the vehicle. A manual operating switch panel 6 comprising a digital code switch is adapted to issue an indication command, modify a current setting form or pattern of visual indication on the screen of the display unit 5 (shifting of a current location on a path of travel, changing of a current scale of indication, etc.) and adjust a current sensitivity for an output from the gas rate sensor 2. A power supply circuit 7 which includes a battery power source E is connected in circuit through an ignition switch "IG.SW" of the vehicle and a fuse F, and is adapted to control the power supply to the heater of the thermostatic control chamber 1 in response to the on/off state of the ignition switch IG.SW. An operating switch encode and power supply control unit 8 is adapted to transmit the operational contents of the operating switch panel 6 as an encode signal to the signal processing unit 4, and also to control the power supply to the power supply circuit 7.

With the above-described construction of the visual travel route indicating apparatus according to the present invention, the aforesaid advantages are effectively attained.

In operation, it is initially required prior to the start-up operation of the vehicle to manually preset a predetermined starting or reference point of the vehicle motion as well as a desired scale of visual indication on the monitor screen of the display unit 5 in accordance with the road map displayed thereon by sending an indication command through the operating unit 6. After such procedures, and after the vehicle has started moving, a single electrical pulse signal is sent from the distance sensor 3 to the signal processing unit 4 at an interval of a unit distance of travel of the vehicle, where the number of pulses thus fed thereto is counted so as to measure a current distance of travel of the vehicle, while also sending the output from the gas rate sensor 2 to the signal processing unit 4, where a current cruising direction or azimuth of the vehicle at each moment for such an interval may be determined as desired. At this moment, the power supply circuit 7 operates to operatively connect the battery power source E to the thermostatic control chamber 1 so that the thermostatic control chamber may be held at a predetermined controlled constant temperature, whereby the gas rate sensor 2 is then prepared to precisely detect a current angular velocity about the yawing axis of the vehicle which occurs during a change in travel direction, if any, free from any influence of a possible change of the external temperature. The signal processing unit 4 then operates, as described hereinabove, to arithmetically obtain from time to time a current location or graphic point of the vehicle (x, y) plotted on the X-Y coordinates on the preselected scale of visual indication in accordance with the current travel distance and azimuthal deviation of the vehicle which has been detected in the manner as described hereinabove, the results of which operation are subsequently stored. The thus stored contents may normally be read out so as to be fed into the display unit 5 for continuous display. At the same time, an azimuthal signal generated at a current location of the vehicle is sent out sequentially from the signal processing unit 4 to the display unit 5.

Figure 2:
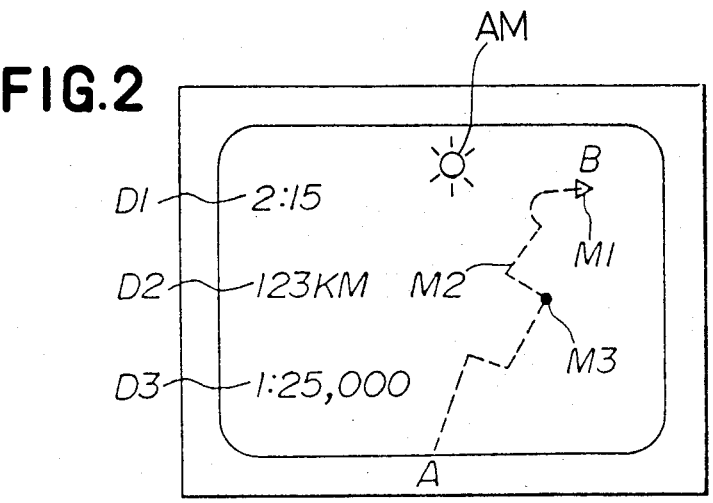
FIG. 2 is a schematic view showing a typical visual indication of a current travel route and bearing status of the vehicle on the display screen of the visual travel route indicating apparatus shown in FIG. 1.

More specifically, as typically shown in FIG. 2, a visual indication on the display unit 5 is displayed schematically in such a manner that there is visually shown an azimuthal indication mark M1 appearing at the current location B of the vehicle and a path of travel indication mark M2 (having a retrieval mark M3 placed thereon) showing the current path of travel from the predetermined starting or reference point A over to the current location B of the vehicle, in a simulated manner to follow the current travel route of the vehicle.

On the other hand, the display unit 5 is also arranged, as shown in FIG. 2, so that there may be indicated additional auxiliary indication in accordance with the signals as supplied from the signal processing unit 4, such as an indication of time D1 which is required for vehicle travel, for instance, from a predetermined reference point to the current location B (which may be implemented by the use of a suitable timer incorporated within the signal processing unit 4 which operates only during the time interval that the vehicle is moving), an indication of the current total mileage D2 up to such location B, and an indication of a display scale D3 selected by way of the manual operating unit 6, as desired.

With the aid of the indication on the display unit 5 as described hereinabove, the driver of the vehicle is able to readily and assuredly identify his direction of travel by reference to a current path of travel as visually indicated upon the screen of the display unit 5 relative to the road patterns on the map shown on the display screen.

When the ignition switch IG.SW is turned off temporarily such as when stopping for a supply of gasoline or for parking along the course of travel, the switching-off of the ignition switch IG.SW is detected by the power supply circuit 7 so as to continue the power supply to the heater for a predetermined period of time so that the temperature within the thermostatic control chamber 1 may be kept as constant as possible for such time period, which operation of such extended power supply to the heater may be indicated to the driver of the vehicle by way of an audible alarm, such as a buzzer.

With the advantageous arrangement as described above, it is not necessary to await a temperature rise up to a desired controlled constant level of the thermostatic control chamber 1, and thus the due visual travel route indication may be very accurately regained on display when the automotive vehicle is restarted with the ignition switch on within the given period of time during which the heater is continuously supplied with power. Because the driver of the vehicle is informed of the continued supply of power to the heater by way of a suitable alarm which is designed to continue warning the driver, whereby it is also feasible to secondarily warn the driver of an inadvertency in leaving the ignition switch to be turned on with the lack of such warning, there may thus be prevented an unnecessary power consumption of the supply due to a possible inadvertency in leaving the main switch of the visual travel route indicating apparatus on.

Figure 3:
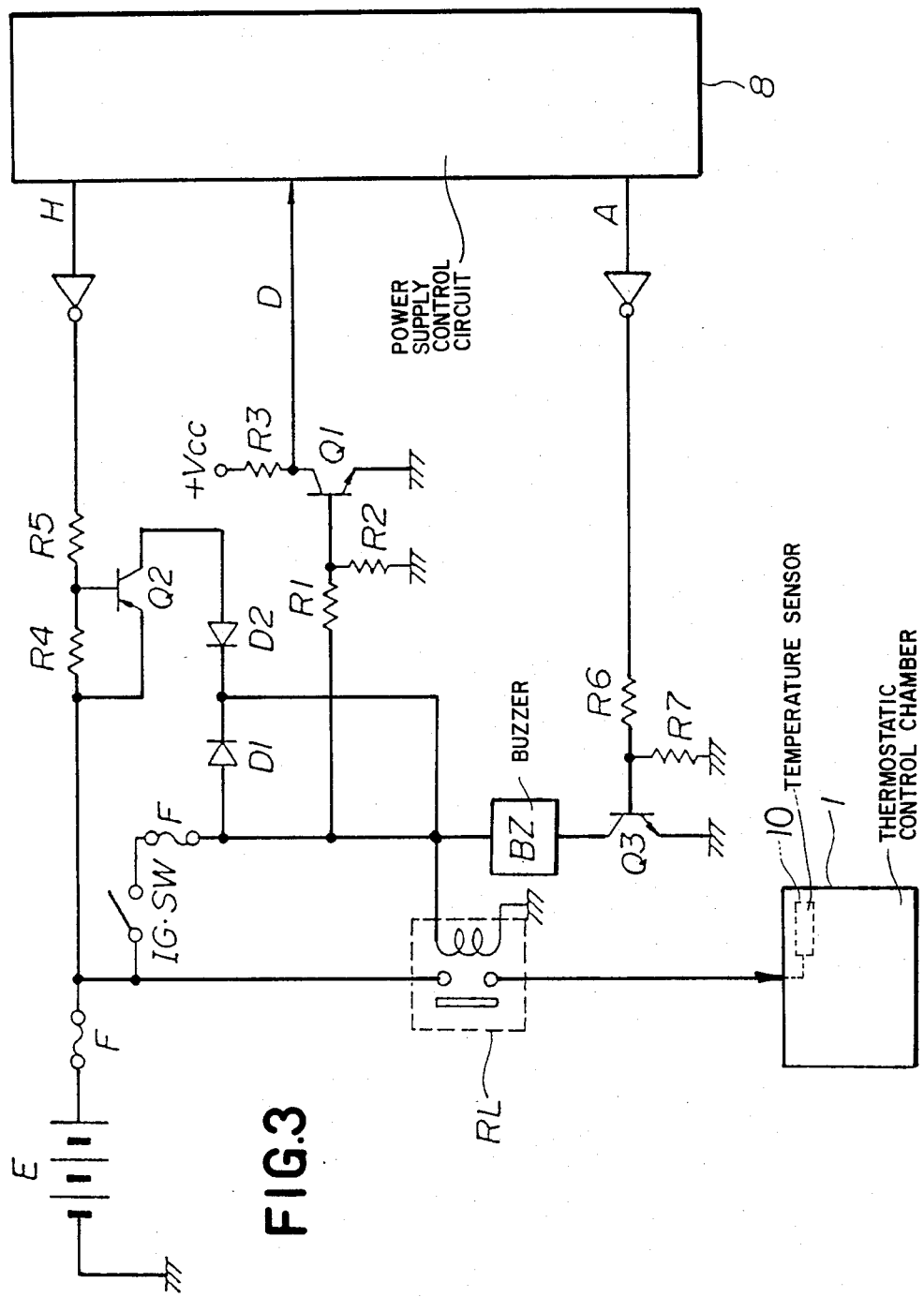
FIG. 3 is a circuit diagram showing a typical construction of the power supply circuit in the FIG. 1 embodiment of the invention.

With reference to FIG. 3, there is shown a typical construction of the power supply circuit 7 for use in the visual travel route indicating apparatus of the present invention. A relay RL is adapted to turn on/off the main circuit for operatively connecting the battery power source E to the thermostatic control chamber 1, and a relay energizing circuit is adapted to energize the operating coil of the relay RL from the battery power source E through the ignition switch IG.SW and a diode D1. An ignition switch on/off detecting circuit includes voltage dividing resistors R1, R2, a transistor Q1 and a resistor R3 which are in circuit to detect the on/off state of the ignition switch IG.SW and send the thus-detected signal D to the operating switch encode and power supply control unit 8. A relay self-holding circuit includes resistors R4, R5, a transistor Q2 and a diode D2 which are in circuit to have the relay RL self-held with a holding command H generated from the operating switch encode and power control unit 8 at the time when the ignition switch IG.SW is detected to be opened by the ignition switch on/off detecting circuit.

Also provided is a control circuit for an alarm such as a buzzer, which includes voltage dividing resistors R6, R7 and a transistor Q3 which are in circuit to likewise supply the power from the battery source E to the buzzer BZ in response to a warning command A generated from the operating switch encode and power supply control unit 8 when the ignition switch IG.SW is detected to be opened.

With such construction of the power supply circuit 7 as described hereinabove, the circuit operates in such a manner that the coil of the relay RL is energized through the relay energizing circuit at the time when the vehicle is in operation (i.e., when the ignition switch IG.SW is closed), and the power from the battery source E is supplied through the a-contact of relay RL to the thermostatic control chamber 1, thus heating the heater of the thermostatic control chamber 1 so that the atmosphere in the chamber may be held at a desired constant temperature. Under such condition, should the ignition switch IG.SW be turned off once for parking purposes, etc., such switching-off state is detected by the detection circuit including the transistor Q1, etc., and a detection signal of logic "0" (a signal of logic "1" being delivered when the ignition switch IG.SW is closed) is then delivered to the operating switch encode and power supply control unit 8, thereby producing a holding command H to be given by the control unit 8 to the power supply circuit 7 for a predetermined period of time only (e.g., 5 to 10 minutes). The power supply circuit 7 then operates to turn on the transistor Q2 in response to such holding command H, thus providing a selfholding circuit (R4, R5, Q2 and D2) for the relay RL so as to have the relay RL energized continuously, whereby the power supply to the heater of the thermostatic control chamber 1 is thus continued. At this moment, there is provided concurrently a warning command A from the operating switch encode and power supply control unit 8 to the power supply circuit 7, while the power supply circuit 7 functions in such a manner that the transistor Q2 in the buzzer circuit is turned to be conductive in response to command A, thus operating the buzzer BZ to produce an audible warning to the driver of the vehicle. If the ignition switch IG.SW is closed again within the predetermined period of time, the relay RL is directly energized from the relay energizing circuit, whereby the power source E is operatively connected to the themostatic control chamber 1 so that the power supply to that chamber 1 is rendered continuously. On the other hand, when the ignition switch IG.SW is not closed within the given period of time, the relay holding circuit for the relay RL is released after the lapse of such period of time, which results in termination of the power supply to the thermostatic control chamber 1 from the battery source E.

As described hereinabove, according to the present invention there is provided an improved visual travel route indicating apparatus of the type wherein a current location of a vehicle (such as an automotive vehicle) in terms of a current graphic point plotted on the two-dimensional coordinates per a given unit travel distance of the vehicle is arithmetically obtained from the output of a distance sensor for detecting a current travel distance of the vehicle and the output of a gas rate sensor for detecting a current azimuthal deviation as generated by the vehicle during a turning operation away from a current travel direction thereof. The thus-obtained data on current location of the vehicle changes from time to time as the vehicle continues its motion and is stored in sequence so as to visually indicate a continuous path of travel or locus of the vehicle in motion on the monitor screen. The gas rate sensor is isolated within a thermostatic control chamber having a suitable heater incorporated therein, and there is also provided an improved power supply circuit which is adapted to detect the on/off state of the ignition switch of the vehicle, so that when the ignition switch is detected to be closed, the power supply to the thermostatic control chamber is directly rendered through a relay. When the ignition switch is detected to be opened, the power supply to the thermostatic chamber is held through the relay self-holding circuit which is operated for a predetermined period of time, and is also adapted to operate a suitable alarm such as a buzzer, as necessary. With the uniquely advantageous features attained by such construction, there is provided an accurate detection of azimuthal deviation generated by the vehicle during turning motion away from a current travel direction thereof by way of the advantageous thermal isolating arrangement of the gas rate sensor so as to be free from any possible disturbances from external temperature fluctuations, thus assuring a precise and reliable visual indication of a current travel route of the vehicle. More specifically, an extended power supply to the thermostatic control chamber may be continued for the predetermined period of time even when the ignition switch of the vehicle is turned off for parking purposes, etc., thus making it possible to immediately restore the assured control of the visual travel route indication when the vehicle is restarted within the given period of time.

Figure 4A:
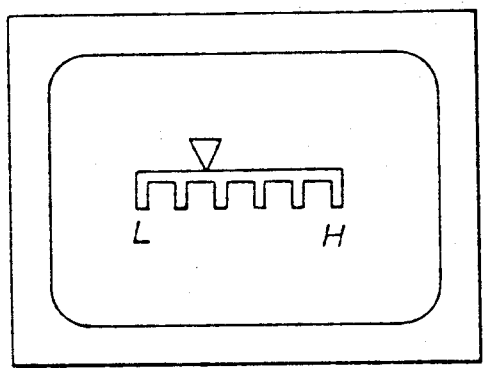
FIGS. 4a and 4b are schematic views showing the visual indications on the display screen of the apparatus of the FIG. 1 embodiment for an unstable temperature condition and stable temperature condition, respectively, in the thermostatic control chamber of the apparatus.

With regard to the feature of the invention of ascertaining through the visual inspection on the display as to whether the temperature of the atmosphere within the thermostatic control chamber has reached a predetermined stable or equilibrium state, the visual travel route indicating apparatus is arranged such that a specific procesing is applied to the signal processing unit 4 as a first step to determine that the desired stable or equilibrium state of the temperature within the thermostatic control chamber 1 is eventually reached in terms of the lapse of the predetermined period of time during which the heater of the thermostatic control chamber is powered, the signal processing unit 4 determining thereupon whether or not the atmosphere in the thermostatic control chamber 1 reaches the desired stable or equilibrium temperature state. When it is found that the atmosphere has not yet reached the desired controlled state, the visual indication of the travel route of the vehicle on the display unit 5 is then forced into a waiting state until a due indication of the satisfactory equilibrium state of the atmosphere within the thermostatic control chamber 1 is shown on the display unit 5 (FIG. 4a).

More specifically, when commencing the supply of power to the thermostatic control chamber 1 at the initial starting of the engine of the vehicle after parking or stopping for a relatively long period of time, a certain time lapse is required until the atmospheric temperature in the thermostatic control chamber 1 reaches again the desired constant state, during which the output from the gas rate sensor 2 would very possibly be unstable so as to eventually result in an undesirable error in the visual indication of the travel route of the vehicle on the display. In this respect, it is essential that the signal processing unit 4 be arranged to disable a visual indication on the display until the atmospheric temperature of the thermostatic control chamber 1 reaches the controlled constant state. It is also arranged that the data to direct a visual indication on the display which is stored in the signal processing unit 4 is concurrently fed into the display unit 5 so that such a visual indication on the monitor screen as shown in FIG. 4a may be given. As shown in FIG. 4a, a pointer of triangular shape is adapted to move in sliding motion along a notched scale in accordance with a current lapse of the predetermined period of time in accordance with a current temperature of the atmosphere within the thermostatic control chamber 1.

Figure 4B:
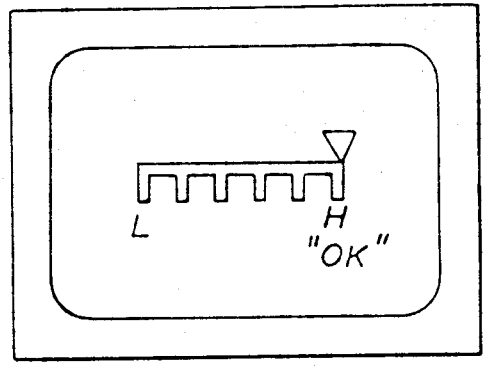

When it is determined by the signal processing unit 4 that the temperature of the atmosphere within the thermostatic control chamber 1 has reached the desired constant state, there is given a blinking indication of the character "OK" on the screen of the display unit 5 as shown in FIG. 4b so that the driver of the vehicle is alerted to the fact that the desired equilibrium state within the thermostatic control chamber has been reached. It is arranged that if the driver once stops the cruising speed of the vehicle with respect to the ground upon the recognition of the "OK" sign on the diplay screen, the distance sensor 3 detects such stationary state of the vehicle, and the inhibition of the visual indication on the display is released so that the current offset adjustment on the output of the gas rate sensor 2 may automatically be normalized in the signal processing unit 4, whereby the due visual indication of the travel route of the vehicle (FIG. 2) may then be made so as to continuously follow the vehicle's travel from that moment on.

In this manner, by virtue of the feature particular to the visual travel route indicating apparatus according to the present invention wherein the visual indication on the display is inhibited until the moment that the atmospheric temperature in the thermostatic control chamber 1 reaches the desired stable state at the time of starting the vehicle, a possible improper or erroneous guidance which is occasionally attributable to an output from the gas rate sensor having a relatively large extent of error in detection may advantageously be positively prevented from being given to the driver of the vehicle.

As described hereinabove, according to the invention there is provided an improved visual travel route indicating apparatus of the type wherein a current location of a vehicle (such as an automobile) in terms of a current graphic point as plotted on the two-dimensional coordinates per a given unit travel distance of the vehicle is arithmetically obtained from the output of a distance sensor for detecting a current travel distance of the vehicle and the output of a gas rate sensor for detecting a current azimuthal deviation as generated by the vehicle during a turning operation away from a current travel direction thereof. The thus-obtained data on a current location of the vehicle changes from time to time as the vehicle continues its motion and is stored in sequence so as to visually indicate a continuous path of travel or locus of the vehicle in continued motion on the monitor screen. In accordance with the invention there is provided a gas rate sensor which is isolated within the thermostatic control chamber having the heater adapted to be supplied with the power at the moment of switching-on of the ignition switch of the vehicle, the signal processing unit being functional to determine and process the state of the atmospheric temperature within the thermostatic control chamber in terms of the lapse of a predetermined period of time during which the heater is supplied with the power so that the visual indication on the display of the travel route of the vehicle in cruising motion may be started upon the attainment of a due offset adjustment of the output of the gas rate sensor by once stopping the vehicle motion after the equilibrium state of the thermostatic control chamber temperature is reached. There is thus attained the uniquely advantageous feature of providing an accurate detection of azimuthal deviation generated by the vehicle during a turning motion away from a constant travel direction thereof by way of the advantageous thermal isolation arrangement of the gas rate sensor so as to be free from any possible disturbances from external temperature fluctuations and under a stable state of the atmospheric temperature in the thermostatic chamber, thus assuring a precise detection of the current azimuthal deviation of the vehicle and presenting a constantly reliable visual indication of the current travel route of the vehicle on the display unit.

In accordance with another advantageous feature of the visual travel route indicating apparatus according to the invention, an abnormal temperature of the atmosphere of the thermostatic control chamber 1 in which the gas rate sensor is hermetically incorporated may be detected through a regular check to be performed at the signal processing unit 4 on the offset output of the gas rate sensor 2 when the vehicle is standing still or has a zero velocity with respect to the ground, and upon detection of such an abnormal temperature of the atmosphere in the thermostatic control chamber there is produced a visual warning to that effect on the display unit 5 to the driver of the vehicle.

More specifically, the offset output from the gas rate sensor 2 produced at the time when the atmospheric temperature of the thermostatic control chamber 1 is held at the desired constant level, and the vehicle is standing still at the same time, is taken to be a constant reference value. If there occurs an abnormal temperature in the atmosphere of the thermostatic control chamber, i.e., if it is extraordinarily high or low with respect to the constant reference value, the offset output from the gas rate sensor 2 then changes to be higher or lower than the normal constant reference level. In this respect, it is specifically arranged that the offset outputs from the gas rate sensor 2 are read out and stored in the signal processing unit 4 at each time the vehicle is stopped, and that the thus-observed offset output V(t2) at a current time when the vehicle is stopped and the other output V(t1) at the previous time are taken to be calculated by the following equation:

$$S = [V(t2) - V(t1)]/T \qquad (1)$$

where $T = t2 - t1$.

When a resultant value S is greater than a predetermined value K, there is then generated a warning signal to be given to the display unit 5 so that a visual mark AM (see FIG. 2) indicating the occurrence of an abnormal temperature in the thermostatic control chamber is indicated on the display unit 5 so as to alert the driver of the vehicle as to same.

There is thus provided in accordance with the foregoing feature of the invention an improved visual travel route indicating apparatus wherein the occurrence of an abnormal temperature of the atmosphere in the thermostatic control chamber 1 in which a gas rate sensor which is very sensitive to a temperature change is incorporated within the thermostatic control chamber held at a constant temperature is detected from a change in the offset output of the gas rate sensor 2 at the time when the vehicle is standing still or is motionless, upon which occurrence of an abnormal temperature there is produced a visual warning indication on the monitor screen of the display unit 5 (or an audible warning from an alarm device such as a buzzer to be operated upon a warning signal from the signal processing unit 4). In this manner, there is attained the uniquely advantageous feature of positively preventing a possible erroneous guidance to the driver of the vehicle with respect to the current visual travel route indication of the vehicle.

It is clear from the foregoing description that the various objects set forth hereinabove are efficiently attained by the present invention, and because various changes and modifications may be made therein without departing from the spirit and scope of the invention it is intended that the foregoing description including the accompanying drawings should be interpreted as illustrative, and not restrictive. The scope of the invention is indicated by the appended claims rather than by the foregoing description.

We claim:

1. In a visual travel route indicating apparatus for use in a vehicle wherein a current location point in terms of two-dimensional coordinates per a given unit distance of travel of the vehicle is arithmetically obtained from a current output from a distance sensor for detecting a current distance of travel of the vehicle with respect to a starting point and a current output from a gas rate sensor for detecting a current azimuthal deviation generated by the vehicle during a turning operation, the thus-obtained data on a current location of the vehicle changing from time to time as the vehicle travel progresses being stored in sequence so as to be appropriately processed for visually displaying a finite yet continuous path of travel of the vehicle, said indicating apparatus including at least a power source;

an improvement comprising:
a thermostatic control chamber, said gas rate sensor being isolated within the atmosphere of said thermostatic control chamber so as to permit heating thereof to a desired constant temperature;
power supply circuit means for detecting the on/off state of an ignition switch of said vehicle;
said power supply circuit means including relay means, operatively connected with said power source, for directly supplying power from said source to said thermostatic control chamber when said ignition switch is detected to be closed; and
self-holding circuit means operatively cooperating with said relay means for holding said relay means so as to supply power to said thermostatic control chamber when said ignition switch is detected to be opened.

2. A visual travel route indicating apparatus according to claim 1, further comprising:
alarm means operatively cooperating with said power supply circuit means so as to operate with said self-holding circuit means for said relay means when said ignition switch is detected to be opened.

3. A visual travel route indicating apparatus according to claim 1, wherein:
said gas rate sensor is isolated hermetically within the atmosphere of said thermostatic control chamber and is adapted to be heated to said desired constant temperature by heating means supplied with power from said source at the moment when said ignition switch is detected to be opened; and a visual indication of the travel route of said vehicle is inhibited until said vehicle is stopped once after a due lapse of a predetermined period of time during which the atmospheric temperature of said thermostatic control chamber reaches a desired state of equilibrium, and until an offset adjustment on the output from said gas rate sensor is completed.

4. A visual travel route indicating apparatus according to claim 3, further comprising:
temperature sensor means for providing a visual indication of a current state of the atmospheric temperature of said thermostatic control chamber on a display screen for a period of time until after the atmospheric temperature of said thermostatic control chamber reaches said desired state of equilibrium, and thereafter a stationary state of said vehicle is detected by said distance detector.

5. A visual travel route indicating apparatus according to claim 1, further comprising:
means for detecting a current change in the output from said gas rate sensor, indicating the occurrence of an abnormal temperature within said thermostatic control chamber, when said vehicle is motionless so as to produce a warning to a driver of said vehicle.

* * * * *